United States Patent
Mihara et al.

(10) Patent No.: US 11,433,692 B2
(45) Date of Patent: Sep. 6, 2022

(54) DETECTION SENSOR, DETECTION DEVICE, CONVEYING DEVICE, AND IMAGE FORMING DEVICE

(71) Applicant: FUJIFILM BUSINESS INNOVATION CORP., Tokyo (JP)

(72) Inventors: Akira Mihara, Kanagawa (JP); Kazuhiro Sakai, Kanagawa (JP); Masaya Kumei, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 120 days.

(21) Appl. No.: 16/836,981

(22) Filed: Apr. 1, 2020

(65) Prior Publication Data

US 2021/0039406 A1 Feb. 11, 2021

(30) Foreign Application Priority Data

Aug. 9, 2019 (JP) .............................. JP2019-148000

(51) Int. Cl.
| | |
|---|---|
| B41J 29/38 | (2006.01) |
| B41J 13/00 | (2006.01) |
| B65H 20/02 | (2006.01) |
| G01P 3/36 | (2006.01) |

(52) U.S. Cl.
CPC .......... *B41J 13/0009* (2013.01); *B65H 20/02* (2013.01); *G01P 3/36* (2013.01); *B65H 2513/10* (2013.01)

(58) Field of Classification Search
CPC ....... B41J 11/0095; B41J 13/0009; B41J 2/01
See application file for complete search history.

(56) References Cited

U.S. PATENT DOCUMENTS

2017/0057258 A1* 3/2017 Otsuka ................. B41J 13/0009

FOREIGN PATENT DOCUMENTS

| JP | 2012163370 A | * 8/2012 |
|---|---|---|
| JP | 2018-51765 A | 4/2018 |

* cited by examiner

*Primary Examiner* — Lam S Nguyen
(74) *Attorney, Agent, or Firm* — Oliff PLC (57) ABSTRACT

A detection sensor includes: a single light-emitting element that radiates light onto a conveyed material; and multiple light-receiving elements that receive interference light including the light that is scattered at a surface of the conveyed material and the light that is scattered inside the conveyed material.

6 Claims, 6 Drawing Sheets

DETECTION SENSOR, DETECTION DEVICE, CONVEYING DEVICE, AND IMAGE FORMING DEVICE

CROSS-REFERENCE TO RELATED APPLICATIONS

This application is based on and claims priority under 35 USC 119 from Japanese Patent Application No. 2019-148000 filed Aug. 9, 2019.

BACKGROUND

(i) Technical Field

The present disclosure relates to a detection sensor, a detection device, a conveying device, and an image forming device.

(ii) Related Art

Japanese Unexamined Patent Application Publication No. 2018-051765 discloses a substrate processing device provided with: a conveying mechanism that conveys a long strip-shaped base material in a longitudinal direction along a conveyance path configured of multiple rollers; a processing unit that processes the base material in a processing position on the conveyance path; an encoder that detects the rotation speed of a detection roller that is one of the multiple rollers; and a controller that acquires a detection signal from the encoder and controls the processing unit. The controller has: a first speed acquisition unit that acquires a first speed that is the conveying speed of the base material indicated by the detection signal; a second speed acquisition unit that acquires a second speed that is the conveying speed of the base material on the conveyance path, separate from the first speed acquisition unit; a slip determination unit that determines whether or not a slip of the base material with respect to the detection roller has occurred, by comparing the first speed and the second speed; a third speed acquisition unit that, in a case where it is determined that the slip has occurred, acquires a third speed by correcting the first speed; and an operation command unit that outputs an operation command to the processing unit on the basis of the third speed.

SUMMARY

In a configuration in which the conveying speed of a conveyed material is detected using a detection sensor provided with a single light-emitting element that radiates light onto the conveyed material and a single light-receiving element that receives light scattered by the conveyed material, there are cases where detection errors occur.

Aspects of non-limiting embodiments of the present disclosure relate to reducing detection errors for the conveying speed of a conveyed material compared to a configuration provided with a single light-emitting element and a single light-receiving element.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a detection sensor including: a single light-emitting element that radiates light onto a conveyed material; and multiple light-receiving elements that receive interference light including the light that is scattered at a surface of the conveyed material and the light that is scattered inside the conveyed material.

BRIEF DESCRIPTION OF THE DRAWINGS

An exemplary embodiment of the present disclosure will be described in detail based on the following figures, wherein.

DETAILED DESCRIPTION

Hereinafter, an example of an exemplary embodiment according to the present disclosure will be described on the basis of the drawings.

(Ink Jet Recording Device 10)

Figure 1:
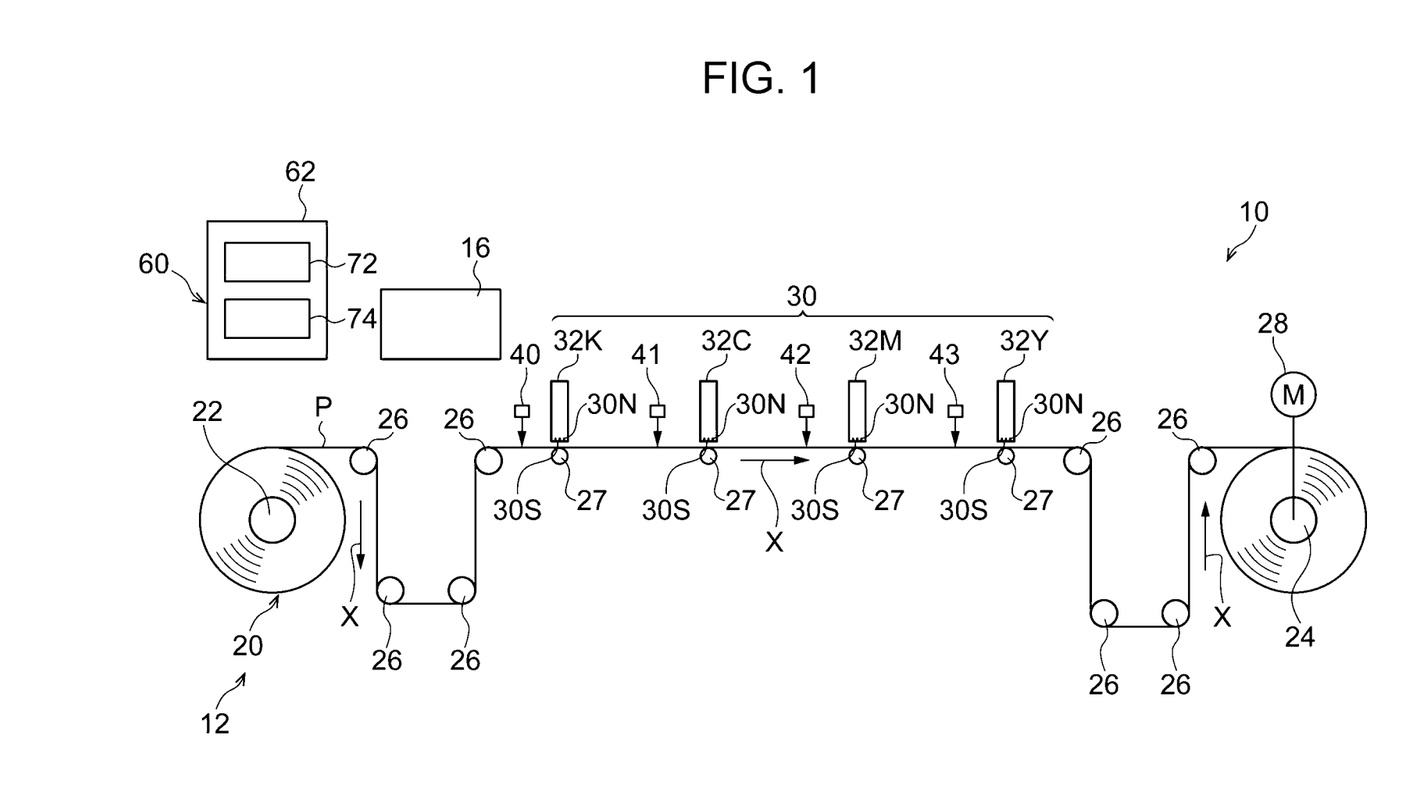
FIG. 1 is a schematic diagram depicting the configuration of an ink jet recording device according to the present exemplary embodiment.

First, an ink jet recording device 10 will be described. FIG. 1 is a schematic diagram depicting the configuration of the ink jet recording device 10.

The ink jet recording device 10 depicted in FIG. 1 is an example of an image forming device that forms an image on a recording medium. Specifically, the ink jet recording device 10 is a device that discharges ink droplets onto continuous paper P (an example of a recording medium) to form an image on the continuous paper P, as depicted in FIG. 1. In other words, it can also be said that the ink jet recording device 10 is an example of a discharge device that discharges droplets.

More specifically, the ink jet recording device 10 is provided with a conveying device 12, an image forming mechanism 30, and a control unit 16, as depicted in FIG. 1. Hereinafter, the specific configuration of each unit (the conveying device 12, the image forming mechanism 30, and the control unit 16) of the ink jet recording device 10 will be described.

(Conveying Device 12)

The conveying device 12 depicted in FIG. 1 is a device that conveys a recording medium serving as an example of a conveyed material. Specifically, the conveying device 12 is a device that conveys continuous paper P serving as an example of a recording medium. More specifically, the conveying device 12 has a conveying mechanism 20 and a detection device 60.

The continuous paper P to be conveyed is a long recording medium that is long in the conveyance direction in which the continuous paper P is conveyed. Specifically, the continuous paper P may also be paper in which multiple pages are arranged in the conveyance direction. It should be noted that an example of a conveyed material and an example of a recording medium are not restricted to the continuous paper P. For example, flat sheets of paper may be an example of a conveyed material and an example of a recording medium.

Hereinafter, the specific configuration of each unit (the conveying mechanism 20 and the detection device 60) of the conveying device 12 will be described. It should be noted that the detection device 60 will be described after the image forming mechanism 30 for the convenience of the description.

(Conveying Mechanism 20)

The conveying mechanism 20 is an example of a conveying unit that conveys a conveyed material. Specifically, the conveying mechanism 20 is a mechanism that conveys the continuous paper P. More specifically, the conveying mechanism 20 has a wind-out roller 22, a wind-in roller 24, multiple winding rollers 26, and multiple support rollers 27, as depicted in FIG. 1.

The wind-out roller 22 is a roller that winds out the continuous paper P. The continuous paper P is wound around the wind-out roller 22 in advance. The wind-out roller 22 rotates and thereby winds out the continuous paper P that is wound therearound.

The multiple winding rollers 26 are rollers over which the continuous paper P is wound. Specifically, the continuous paper P is wound over the multiple winding rollers 26 between the wind-out roller 22 and the wind-in roller 24. The conveyance path of the continuous paper P from the wind-out roller 22 to the wind-in roller 24 is thereby determined. Each of the multiple support rollers 27 is a roller that supports the continuous paper P below each discharge head 32Y, 32M, 32C, and 32K described later in the image forming mechanism 30.

The wind-in roller 24 is a roller that winds in the continuous paper P. The wind-in roller 24 is rotationally driven by a driving unit 28. Thus, when the wind-in roller 24 winds in the continuous paper P, the wind-out roller 22 winds out the continuous paper P. Also, when the continuous paper P is wound in by the wind-in roller 24, the continuous paper P is wound out by the wind-out roller 22 and is thereby conveyed. The multiple winding rollers 26 and the multiple support rollers 27 rotate in accordance with the movement of the continuous paper P that is conveyed. It should be noted that, in the drawings, the conveyance direction of the continuous paper P (may be referred to as the "paper conveyance direction" hereinafter) is depicted by an arrow X, as appropriate.

It should be noted that the configuration of the conveying mechanism 20 is not restricted to the aforementioned configuration. For example, the configuration of the conveying mechanism 20 may be a configuration that conveys the continuous paper P from a housing unit in which the continuous paper P is housed in a folded state, to a housing unit in which the continuous paper P is housed in such a way as to be folded. Furthermore, the configuration of the conveying mechanism 20 may be a configuration in which a pair of conveying rollers or a conveying belt or the like is used as a conveying member that conveys the continuous paper P.

(Image Forming Mechanism 30)

The image forming mechanism 30 depicted in FIG. 1 is a mechanism that forms an image on a recording medium. Specifically, the image forming mechanism 30 discharges ink droplets onto the continuous paper P conveyed by the conveying mechanism 20 to form an image. In other words, it can also be said that the image forming mechanism 30 is an example of a discharge device that discharges ink droplets as droplets.

More specifically, the image forming mechanism 30 has the discharge heads 32Y, 32M, 32C, and 32K (hereinafter, referred to as 32Y to 32K), as depicted in FIG. 1.

The discharge heads 32Y to 32K are heads that discharge ink droplets. Specifically, the discharge heads 32Y to 32K discharge ink droplets of the colors of yellow (Y), magenta (M), cyan (C), and black (B) onto the continuous paper P to form an image on the continuous paper P. More specifically, the discharge heads 32Y to 32K are configured as described hereinafter.

As depicted in FIG. 1, the discharge heads 32Y to 32K are arranged in this order toward the upstream side of the paper conveyance direction. The discharge heads 32Y to 32K are long in the width direction of the continuous paper P (may be referred to as the "paper width direction" hereinafter). It should be noted that the paper width direction is a direction intersecting (specifically, a direction orthogonal to) the paper conveyance direction, and is depicted in the drawings by an arrow Y, as appropriate.

The discharge heads 32Y to 32K have nozzle surfaces 30S in which nozzles 30N are formed. The nozzle surfaces 30S of the discharge heads 32Y to 32K face downward and oppose the continuous paper P conveyed by the conveying mechanism 20. The discharge heads 32Y to 32K discharge ink droplets from the nozzles 30N onto the continuous paper P using a publicly-known method such as a thermal method or a piezoelectric method.

Water-based ink and oil-based ink are examples of the ink used in the discharge heads 32Y to 32K. Water-based ink includes, for example, a solvent containing water as the principle component thereof, a colorant (specifically, a pigment, a dye, or the like), and other additives. Oil-based ink includes, for example, an organic solvent, a colorant (specifically, a pigment, a dye, or the like), and other additives.

Here, the discharge head 32K is an example of a first forming unit. The discharge heads 32C, 32M, and 32Y are examples of second forming units. The discharge heads 32C, 32M, and 32Y discharge ink droplets onto the continuous paper P to form an image on the continuous paper P, at a timing that is corrected based on the conveying speed of the continuous paper P detected by the detection device 60.

It should be noted that any one or two of the discharge heads 32C, 32M, and 32Y may be understood to be examples of the second forming unit. Consequently, in the present exemplary embodiment, in a case where the discharge head 32K is taken as an example of the first forming unit, it is possible for at least one of the discharge heads 32C, 32M, and 32Y to be used as an example of the second forming unit.

(Detection Device 60)

The detection device 60 depicted in FIG. 1 is an example of a detection device that detects the conveying speed of a conveyed material, and specifically, is a device that detects the conveying speed of the continuous paper P conveyed by the conveying mechanism 20. More specifically, the detection device 60 has detection sensors 40, 41, 42, and 43 and a detection unit 62, as depicted in FIG. 1.

Hereinafter, the specific configuration of each unit (the detection sensors 40, 41, 42, and 43 and the detection unit 62) of the detection device 60 will be described.

(Arrangement of Detection Sensors 40, 41, 42, and 43)

The detection sensors 40, 41, 42, and 43 depicted in FIG. 1 are sensors that are used to detect the conveying speed of the continuous paper P. The detection sensor 40 is arranged upstream from the discharge head 32K in the paper conveyance direction.

Furthermore, the detection sensors 41, 42, and 43 are arranged among the discharge heads 32Y to 32K in the paper conveyance direction. In other words, the detection sensor 41 is arranged downstream from the discharge head 32K and upstream from the discharge head 32C in the paper conveyance direction. The detection sensor 42 is arranged downstream from the discharge head 32C and upstream from the discharge head 32M in the paper conveyance direction. The detection sensor 43 is arranged downstream from the discharge head 32M and upstream from the discharge head 32Y in the paper conveyance direction.

There may be more than one of each of the detection sensors 40, 41, 42, and 43. The multiple detection sensors 40, 41, 42, and 43 are arranged in the paper width direction, for example. It is thereby possible to detect the conveying speed of multiple sections of the continuous paper P in the paper width direction. It should be noted that the multiple detection sensors 40, 41, 42, and 43 may be arranged in the paper width direction.

(Configuration of Detection Sensors 40, 41, 42, and 43)

The detection sensors 40, 41, 42, and 43 have similar configurations, and therefore the configuration of the detection sensor 41 will be described hereinafter.

Figure 3:
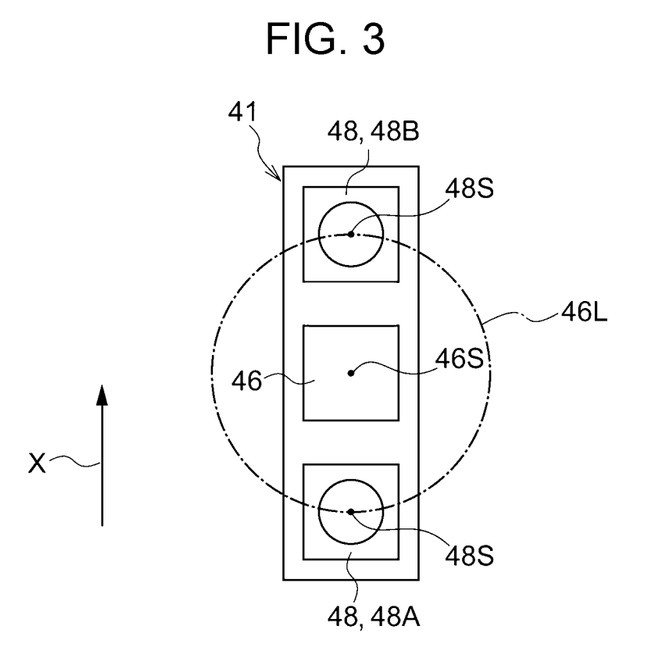
FIG. 3 is a schematic diagram in which the detection sensor according to the present exemplary embodiment is seen from below.

Specifically, the detection sensor 41 has a single light-emitting element 46 and multiple light-receiving elements 48, as depicted in FIG. 3.

Figure 2:
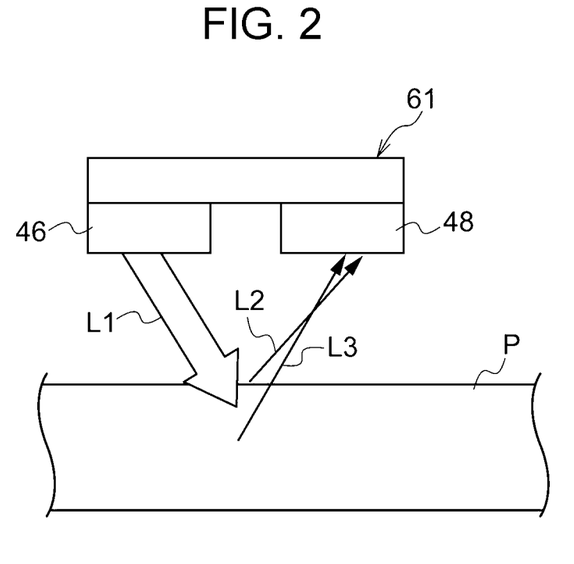
FIG. 2 is a schematic diagram depicting the configuration of a detection sensor according to the present exemplary embodiment.

The light-emitting element 46 is an example of a light-emitting element that radiates light onto a conveyed material. Specifically, as depicted in FIG. 2, the light-emitting element 46 is a light-emitting element that radiates light L1 onto the continuous paper P conveyed by the conveying mechanism 20 (see FIG. 1). More specifically, the light-emitting element 46 is configured of a semiconductor laser (LD: laser diode) that radiates laser light, and more specifically, is configured of a vertical-cavity surface-emitting laser (VCSEL). It should be noted that the light-emitting element 46 is not restricted to a vertical-cavity surface-emitting laser, and, for example, may be an edge-emitting laser or the like.

The light-receiving elements 48 are examples of a light-receiving element that receives interference light including light that is scattered at the surface of a conveyed material and light that is scattered inside the conveyed material. Specifically, as depicted in FIG. 2, the light-receiving elements 48 detect, as a beat signal, the beat of light produced by interference between light L2 that is scattered at the surface of the continuous paper P conveyed by the conveying mechanism 20 (see FIG. 1) and light L3 that is scattered inside the continuous paper P. More specifically, the light-receiving elements 48 are configured of photodiodes (PD). It should be noted that the frequency of the light L2 scattered at the surface of the continuous paper P and the frequency of the light L3 scattered inside the continuous paper P produce a Doppler shift that corresponds to the conveying speed of the continuous paper P, and therefore the beat signal also changes according to the conveying speed of the continuous paper P.

In the present exemplary embodiment, the detection sensor 41 has two light-receiving elements 48A and 48B as the multiple light-receiving elements 48, as depicted in FIG. 3. Each of the light-receiving elements 48A and 48B detects a beat signal.

(Arrangement of Light-Receiving Elements 48)

In plan view, the two light-receiving elements 48A and 48B are arranged such that the light-emitting element 46 is located therebetween, as depicted in FIG. 3. Specifically, in plan view, the two light-receiving elements 48A and 48B are arranged such that the light-emitting element 46 is located therebetween in the paper conveyance direction X. More specifically, the light-receiving element 48A is arranged upstream from the light-emitting element 46 in the paper conveyance direction, and the light-receiving element 48B is arranged downstream from the light-emitting element 46 in the paper conveyance direction. It should be noted that plan view refers to viewing in the vertical direction. FIGS. 3 to 7 depict the case where the detection sensor 41 is seen from the continuous paper P side (from below).

It can also be said that, in plan view, the two light-receiving elements 48A and 48B are arranged in a circumferential direction with the light-emitting element 46 as the center 46S. A configuration of being arranged in the circumferential direction with the light-emitting element 46 as the center 46S refers to a configuration in which at least some of the light-receiving elements 48 are arranged on a line 46L in the circumferential direction with the light-emitting element 46 as the center 46S. In addition, in plan view, the distances from the centers 48S of each of the two light-receiving elements 48A and 48B to the center 46S of the light-emitting element 46 are equal.

Figure 4:
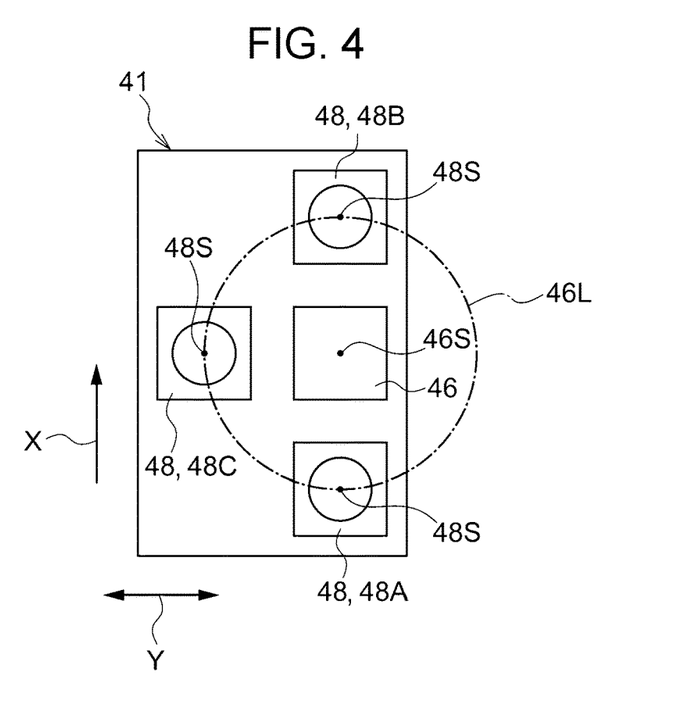
FIG. 4 is a schematic diagram depicting a modified example in which the detection sensor depicted in FIG. 3 is provided with three light-receiving elements.

It should be noted that the detection sensor 41 may be a configuration having three light-receiving elements 48A, 48B, and 48C as the multiple light-receiving elements 48, as depicted in FIG. 4. In the configuration depicted in FIG. 4, in addition to the light-receiving elements 48A and 48B depicted in FIG. 3, a light-receiving element 48C is arranged at one side of the light-emitting element 46 in the paper width direction Y. Consequently, the light-receiving element 48C is arranged downstream from the light-receiving element 48A in the paper conveyance direction, and upstream from the light-receiving element 48B in the paper conveyance direction.

It can also be said that, in plan view, the three light-receiving elements 48A, 48B, and 48C are arranged in a circumferential direction with the light-emitting element 46 as the center 46S. In addition, in plan view, the distances from the centers 48S of each of the three light-receiving elements 48A, 48B, and 48C to the center 46S of the light-emitting element 46 are equal.

Figure 5:
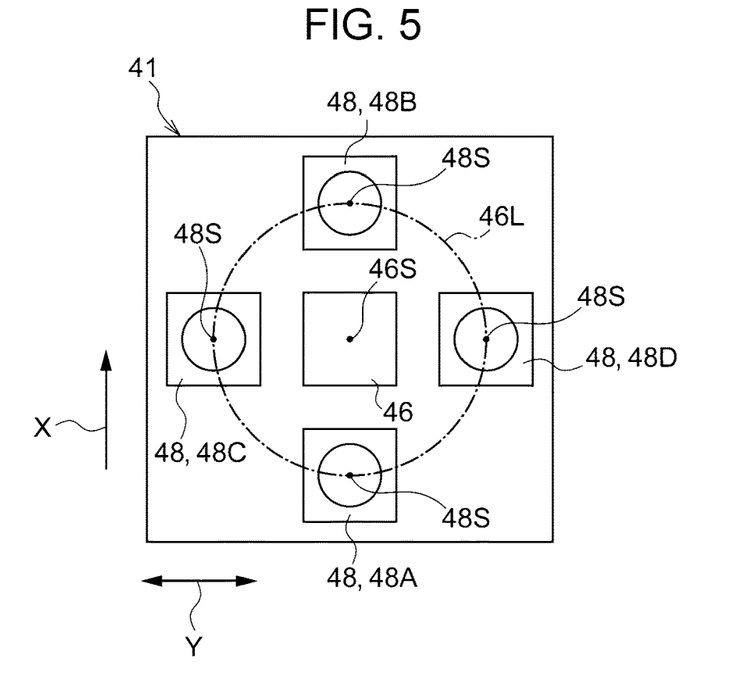
FIG. 5 is a schematic diagram depicting a modified example in which the detection sensor depicted in FIG. 3 is provided with four light-receiving elements.

It should be noted that the detection sensor 41 may be a configuration having four light-receiving elements 48A, 48B, 48C, and 48D as the multiple light-receiving elements 48, as depicted in FIG. 5. In the configuration depicted in FIG. 5, in addition to the light-receiving elements 48A, 48B, and 48C depicted in FIG. 4, a light-receiving element 48D is arranged at the other side of the light-emitting element 46 in the paper width direction. In other words, the light-receiving element 48D is arranged downstream from the light-receiving element 48A in the paper conveyance direction, and upstream from the light-receiving element 48B in the paper conveyance direction.

In addition, it can also be said that, in plan view, the light-receiving elements 48C and 48D are arranged such that the light-emitting element 46 is located therebetween. Specifically, in plan view, the light-receiving elements 48C and 48D are arranged such that the light-emitting element 46 is located therebetween in the paper width direction Y.

Furthermore, it can also be said that, in plan view, the four light-receiving elements 48A, 48B, 48C, and 48D are arranged in a circumferential direction with the light-emitting element 46 as the center 46S. In addition, in plan view, the distances from the centers 48S of each of the four light-receiving elements 48A, 48B, 48C, and 48D to the center 46S of the light-emitting element 46 are equal.

Figure 6:
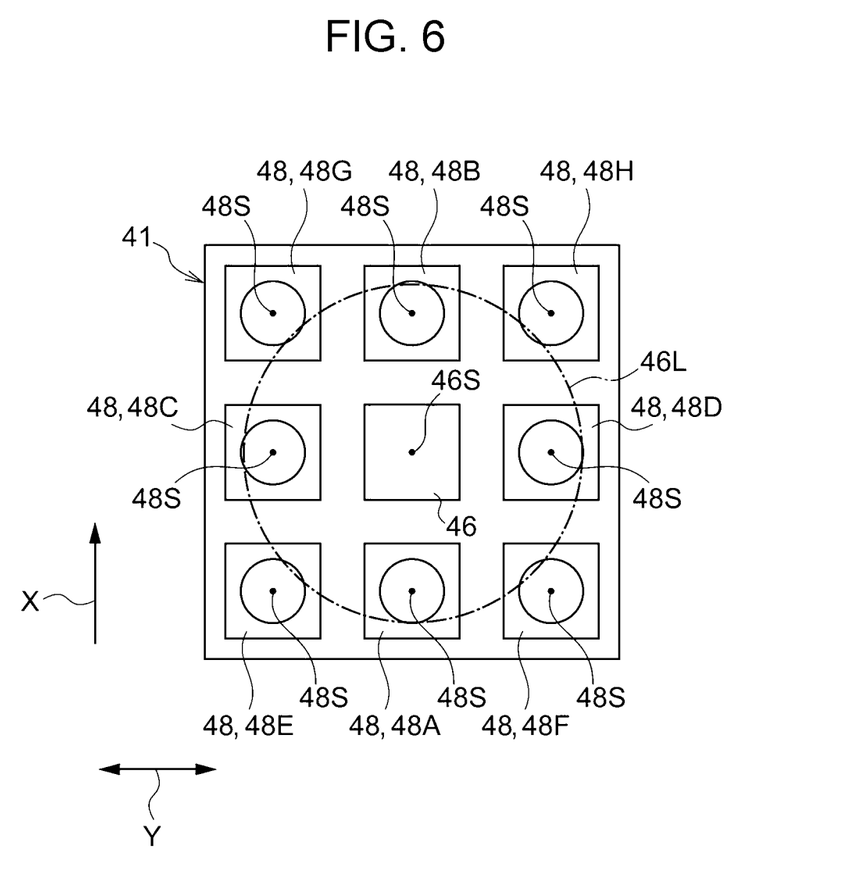
FIG. 6 is a schematic diagram depicting a modified example in which the detection sensor depicted in FIG. 3 is provided with eight light-receiving elements.

Furthermore, the detection sensor 41 may be a configuration having eight light-receiving elements 48A, 48B, 48C, 48D, 48E, 48F, 48G, and 48H as the multiple light-receiving elements 48, as depicted in FIG. 6. In the configuration depicted in FIG. 6, in addition to the light-receiving elements 48A, 48B, 48C, and 48D depicted in FIG. 5, in plan view, light-receiving elements 48E and 48F are arranged such that the light-receiving element 48A is located therebetween in the paper width direction Y, and, in plan view, light-receiving elements 48G and 48H are arranged such that the light-receiving element 48B is located therebetween in the paper width direction Y.

In the detection sensor 41, it can also be said that, in plan view, the light-receiving elements 48E and 48G are arranged such that the light-receiving element 48C is located therebetween in the paper conveyance direction X, and, in plan view, the light-receiving elements 48F and 48H are arranged such that the light-receiving element 48D is located therebetween in the paper conveyance direction X.

In addition, in the detection sensor 41, it can also be said that, in plan view, the light-receiving elements 48E and 48H are arranged such that the light-emitting element 46 is located therebetween in a direction that is oblique with respect to the paper conveyance direction X and the paper width direction Y. In addition, in the detection sensor 41, it can also be said that, in plan view, the light-receiving elements 48F and 48G are arranged such that the light-emitting element 46 is located therebetween in a direction that is oblique with respect to the paper conveyance direction X and the paper width direction Y. It can also be said that, in plan view, the eight light-receiving elements 48A, 48B, 48C, 48D, 48E, 48F, 48G, and 48H are arranged in a circumferential direction with the light-emitting element 46 as the center 46S.

In the configuration depicted in FIG. 6, in plan view, the distances from the centers 48S of each of the four light-receiving elements 48A, 48B, 48C, and 48D to the center 46S of the light-emitting element 46 are equal. Furthermore, in plan view, the distances from the centers 48S of each of the four light-receiving elements 48E, 48F, 48G, and 48H to the center 46S of the light-emitting element 46 are equal. It should be noted that the distances from the centers 48S of each of the four light-receiving elements 48E, 48F, 48G, and 48H to the center 46S of the light-emitting element 46 are longer than the distances from the centers 48S of each of the four light-receiving elements 48A, 48B, 48C, and 48D to the center 46S of the light-emitting element 46.

Figure 7:
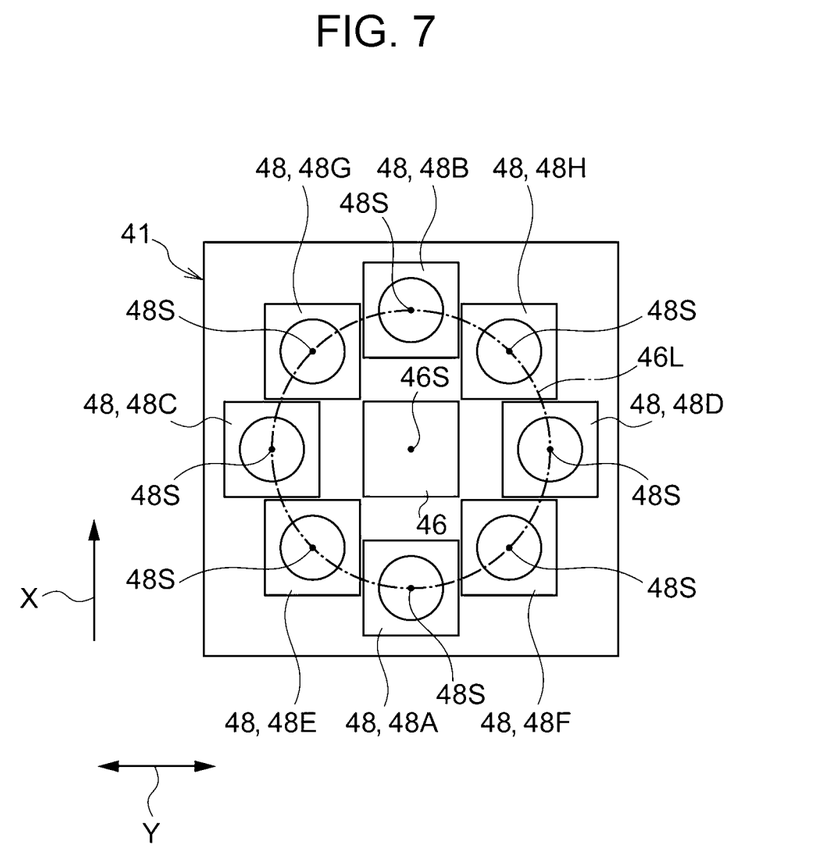
FIG. 7 is a schematic diagram depicting a modified example in which the distance from the centers of each of the eight light-receiving elements to the center of a light-emitting element are equal, in the detection sensor depicted in FIG. 6.

The multiple light-receiving elements 48 may be a configuration having the eight light-receiving elements 48A, 48B, 48C, 48D, 48E, 48F, 48G, and 48H, in which, in addition, the distances from the centers 48S of each of the eight light-receiving elements 48A, 48B, 48C, 48D, 48E, 48F, 48G, and 48H to the center 46S of the light-emitting element 46 are equal, as depicted in FIG. 7.

(Detection Method of Detection Unit 62)

The detection unit 62 is an example of a detection mechanism that detects the conveying speed of a conveyed material. Specifically, the detection unit 62 acquires detection results of the multiple light-receiving elements 48 of the detection sensor 41, and detects the conveying speed of the continuous paper P.

Here, a method for detecting the conveying speed of the continuous paper P in the detection unit 62 will be described.

Figure 8:
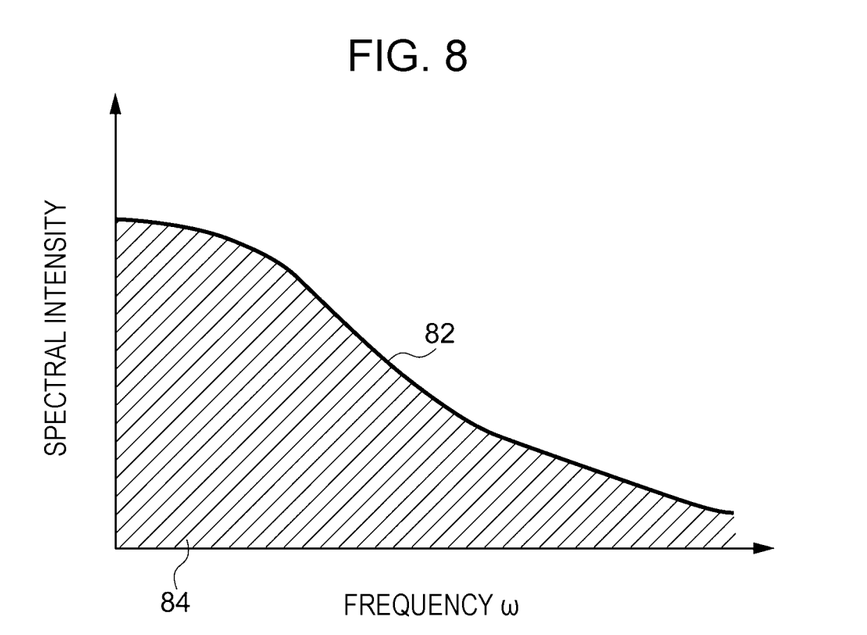
FIG. 8 is a graph depicting a spectral distribution for each frequency per unit time.

The detection unit 62 acquires beat signals detected by each of the multiple light-receiving elements 48. Specifically, in the detection unit 62, signal data of the beat signals detected by each of the multiple light-receiving elements 48 is extracted using a predetermined unit time range, and a fast Fourier transform (FFT), for example, is executed on the data, thereby obtaining a spectral distribution for each frequency $\omega$. FIG. 8 depicts an example of a graph 82 indicating the spectral distribution for each frequency $\omega$ per unit time. It should be noted that the horizontal axis of the graph 82 in FIG. 8 represents the frequency $\omega$ and the vertical axis represents the spectral intensity.

Here, the conveying speed is proportional to the average frequency value of the power spectrum represented by the graph 82, and is therefore proportional to a value obtained by dividing, by the area of the hatched region 84, an integrated value obtained by integrating the product of the frequency $\omega$ and the power spectrum at the frequency $\omega$, with respect to the frequency $\omega$. In the detection unit 62, the integrated value is divided by the area of the hatched region 84 to thereby calculate the conveying speed.

(Specific Configuration of Detection Unit 62)

The detection unit 62, specifically, acquires detection results of the multiple light-receiving elements of the detection sensor 41 and performs averaging processing on the detection results to detect the conveying speed of the continuous paper P.

Figure 9:
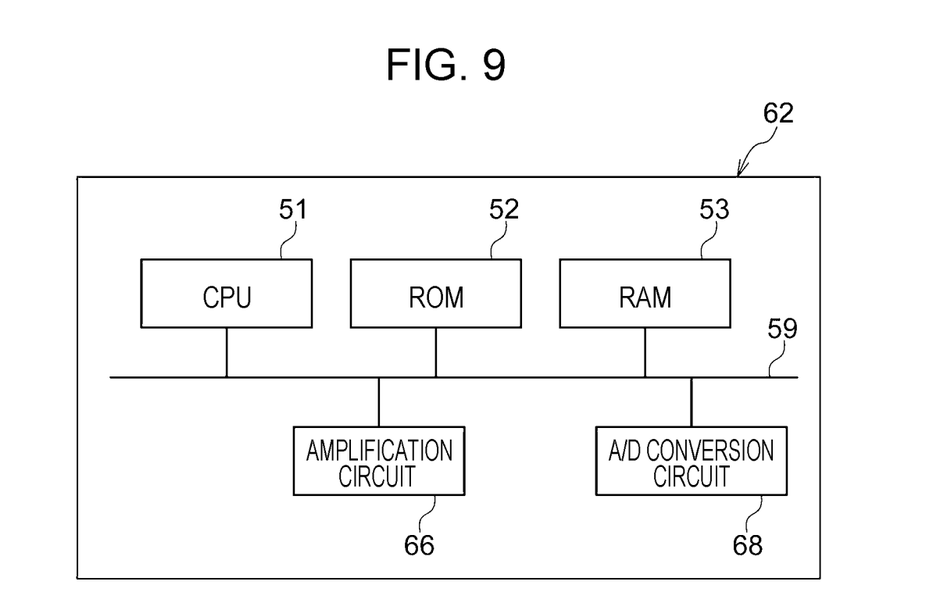
FIG. 9 is a block diagram depicting a specific configuration of a detection unit according to the present exemplary embodiment.

FIG. 9 depicts a block diagram depicting a specific configuration of the detection unit 62. As depicted in FIG. 9, the detection unit 62 has a CPU (central processing unit: processor) 51, a ROM (read-only memory) 52, a RAM (random-access memory) 53, a storage 54, an amplification circuit 66, and an A/D (analog/digital) conversion circuit 68. The units of the detection unit 62 are communicably connected to each other via a bus 59.

The CPU 51 is a central processing unit and executes various types of programs and carries out data processing and so forth. More specifically, the CPU 51 reads a program from the ROM 52 or the storage 54 and executes the program with the RAM 53 as being used a work area.

The ROM 52 stores various types of programs and various types of data. The RAM 53 stores programs or data temporarily as a work area. The storage 54 is configured of an HDD (hard disk drive) or an SSD (solid state drive), and stores various types of programs including an operating system and various types of data.

When the aforementioned programs are executed, the detection unit 62 executes various types of functions using the aforementioned hardware resources. The functional configuration realized by the detection unit 62 will be described.

As a functional configuration, the detection unit 62 has a detection unit 72 and a processing unit 74, as depicted in FIG. 1. Each functional configuration is realized by the CPU 51 reading and executing a program stored in the ROM 52 or the storage 54.

The amplification circuit 66 amplifies voltages corresponding to the intensity of light received by each of the multiple light-receiving elements 48 to a voltage level specified as an input voltage range for the A/D conversion circuit 68. It should be noted that, as an example here, the light-receiving elements 48 are elements that output voltages corresponding to the intensity of received light; however, the light-receiving elements 48 may output current corresponding to the intensity of received light, and in this case, the amplification circuit 66 amplifies the current output by the light-receiving elements 48 to a current level specified as an input current range for the A/D conversion circuit 68.

The A/D conversion circuit 68 has input thereto the voltages amplified by the amplification circuit 66, and converts the amounts of light received by the light-receiving elements 48, represented by the magnitude of the voltages, into numerical values and outputs the numerical values.

The detection unit 72 has input thereto the amounts of received light that have been converted into numerical values by the A/D conversion circuit 68, carries out FFT processing on each amount of light received by the light-receiving elements 48 to detect the spectral distribution for each frequency ω, and uses the detected spectral distribution (see FIG. 8) to calculate a conveying speed in accordance with the method already described.

The processing unit 74 carries out averaging processing on the conveying speed calculated for each light-receiving element 48, and detects the conveying speed of the continuous paper P. In other words, values for the conveying speed calculated for each light-receiving element 48 are added and the result is then divided by the number of light-receiving elements 48 to thereby obtain the conveying speed of the continuous paper P.

It should be noted that in a configuration provided with three or more light-receiving elements 48, averaging processing may be carried out excluding values such as the largest value or the smallest value with which the value of the conveying speed differs considerably, for example.

(Control Unit 16)

The control unit 16 depicted in FIG. 1 is a control unit serving as a control device that controls the operation of each unit of the ink jet recording device 10.

Specifically, the control unit 16 has a storage unit configured of a ROM, a storage, or the like in which programs are stored, and a processor that operates according to the programs. The control unit 16 reads and executes the programs stored in the storage unit and table information, and the operation of each unit of the ink jet recording device 10 including the discharge heads 32Y to 32K is thereby controlled.

The control unit 16 uses the conveying speed of the continuous paper P detected according to the detection result of the detection sensor 40 as a reference speed, and causes the discharge head 32K to discharge ink droplets at a timing that is generated based on this reference speed. In addition, the control unit 16 causes the discharge head 32C to discharge ink droplets at a timing that is corrected based on the conveying speed of the continuous paper P detected according to the detection result of the detection sensor 41. Specifically, in the control unit 16, a correction time is obtained according to the aforementioned reference speed, the conveying speed detected according to the detection result of the detection sensor 41, the discharge distance from the surface of the continuous paper P to the discharge surface of the discharge head 32C, and the discharge speed of the ink droplets, for example, and the discharge timing of the discharge head 32C is increased or decreased by that correction time. Similarly, the control unit 16 causes the discharge head 32M to discharge ink droplets at a timing that is corrected based on the conveying speed of the continuous paper P detected according to the detection result of the detection sensor 42, and causes the discharge head 32Y to discharge ink droplets at a timing that is corrected based on the conveying speed of the continuous paper P detected according to the detection result of the detection sensor 43. It should be noted that the control unit 16 and the detection unit 62 may be configured as a common unit.

(Action and Effect of Present Exemplary Embodiment)

In the present exemplary embodiment, as previously mentioned, specifically, the detection sensor 41 has a single light-emitting element 46 and multiple light-receiving elements 48, as depicted in FIG. 3. Also, detection results of each of the multiple light-receiving elements 48 are acquired and averaging processing is carried out on the detection results to detect the conveying speed of the continuous paper P.

Therefore, detection errors for the conveying speed of the continuous paper P are reduced compared to a configuration in which the detection sensor 41 is provided with a single light-emitting element 46 and a single light-receiving element 48. Thus, fluctuations in the conveying speed of the conveying mechanism 20 are detected with a high degree of precision. As a result, image defects are suppressed.

Here, in a configuration using multiple detection sensors provided with a single light-emitting element and a single light-receiving element (first configuration), due to assembly errors when assembling multiple detection sensors that are separate components, variation in the distance between the light-emitting element 46 of each detection sensor and the continuous paper P and variation in the distance between the light-receiving element 48 of each detection sensor and the continuous paper P may occur.

In response, in the detection sensor 41 which is a single component having a single light-emitting element 46 and multiple light-receiving elements 48, since there is a single light-emitting element 46 the problem of variation in the distance to the continuous paper P does not occur, and also variation in the distance between each light-receiving element 48 and the continuous paper P is unlikely to occur compared to the first configuration.

Furthermore, in the present exemplary embodiment, as previously mentioned, the two light-receiving elements 48A and 48B are arranged such that the light-emitting element 46 is located therebetween in plan view, as depicted in FIG. 3.

Therefore, compared to a configuration in which one light-receiving element 48 and q light-emitting element 46 are arranged such that another light-receiving element 48 is located therebetween, variation in the distance of each of the multiple light-receiving elements 48 to the light-emitting element 46 decreases, and variation in the amount of light received by the multiple light-receiving elements 48 is suppressed.

Specifically, in the present exemplary embodiment, as previously mentioned, in plan view, the two light-receiving elements 48A and 48B are arranged such that the light-emitting element 46 is located therebetween in the paper conveyance direction X.

Thus, it is easy to reduce the dimension of the detection sensor 41 in the paper width direction Y compared to a configuration in which the multiple light-receiving elements 48 are arranged such that the light-emitting element 46 is located therebetween in the paper width direction Y. As a result, it is easy for a highly dense arrangement to be implemented when multiple detection sensors 41 are to be arranged in the paper width direction Y.

Furthermore, in the present exemplary embodiment, as previously mentioned, in plan view, the two light-receiving elements 48A and 48B are arranged in a circumferential direction with the light-emitting element 46 as the center 46S.

Therefore, compared to a configuration in which one light-receiving element 48 and a light-emitting element 46 are arranged in a circumferential direction with another light-receiving element 48 as the center, variation in the distance of each of the multiple light-receiving elements 48 to the light-emitting element 46 decreases, and variation in the amount of light received by the multiple light-receiving elements 48 is suppressed.

Furthermore, in the present exemplary embodiment, as previously mentioned, in plan view, the distances from the centers 48S of each of the two light-receiving elements 48A and 48B to the center 46S of the light-emitting element 46 are equal.

Therefore, variation in the amount of light received by the multiple light-receiving elements 48 is suppressed compared to a configuration in which the distances from the centers of each of the multiple light-receiving elements 48 to the center of the light-emitting element 46 are different.

Furthermore, with a conventional laser Doppler velocimeter it is necessary to focus the laser light using an optical system, but with the detection sensor 41 of the present exemplary embodiment it is not necessary to focus the laser light and the spot diameter of the laser light can be kept large. Therefore, with the detection sensor 41 of the present exemplary embodiment there is less susceptibility to surface irregularities of the continuous paper P (for example, embossed paper) and vibration in the paper thickness direction.

Furthermore, with a conventional laser Doppler velocimeter, although an optical system to separate and focus laser light is necessary, with the detection sensor 41 of the present exemplary embodiment, an optical system is not necessary and therefore the sensor size is reduced. Therefore, the degree of arrangement freedom is high with the detection sensor 41 of the present exemplary embodiment.

Modified Examples

In the present exemplary embodiment, as previously mentioned, in plan view, the two light-receiving elements 48A and 48B are arranged such that the light-emitting element 46 is located therebetween, as depicted in FIG. 3; however, the present disclosure is not restricted thereto. For example, a configuration may be adopted in which one light-receiving element 48 and a light-emitting element 46 are arranged such that another light-receiving element 48 is located therebetween.

Furthermore, in the present exemplary embodiment, as previously mentioned, in plan view, the two light-receiving elements 48A and 48B are arranged in a circumferential direction with the light-emitting element 46 as the center 46S; however, the present disclosure is not restricted thereto. For example, a configuration may be adopted in which one light-receiving element 48 and a light-emitting element 46 are arranged in a circumferential direction with another light-receiving element 48 as the center.

Furthermore, in the present exemplary embodiment, as previously mentioned in plan view, the distances from the centers 48S of each of the two light-receiving elements 48A and 48B to the center 46S of the light-emitting element 46 are equal; however, the present disclosure is not restricted thereto. For example, a configuration may be adopted in which the distances from the centers of multiple light-receiving elements 48 to the center of a light-emitting element 46 are different.

Furthermore, in the present exemplary embodiment, as previously mentioned, the ink jet recording device 10 depicted in FIG. 1 is used as an example of an image forming device; however, the present disclosure is not restricted thereto. For example, an image forming device of an electrophotographic system that forms images on a recording medium using toner may serve as an example of an image forming device. In this case, an example of a conveyed material may be an intermediate transfer body onto which an image is transferred from an image forming unit that forms the image, and which transfers the image to a recording medium.

Furthermore, in the present exemplary embodiment, the control unit 16 uses the conveying speed of the continuous paper P detected according to the detection result of the detection sensor 40 as a reference speed, and causes the discharge head 32K to discharge ink droplets at a timing that is generated based on this reference speed; however, the present disclosure is not restricted thereto. For example, a configuration may be adopted in which the conveying speed of the continuous paper P is detected using an encoder provided on a winding roller 26 arranged upstream of the discharge head 32K in the paper conveyance direction, and the control unit 16 uses that conveying speed as a reference speed and causes the discharge head 32K to discharge ink droplets at a timing that is generated based on this reference speed. It should be noted that the winding roller 26 on which the encoder is provided is taken as a driving roller that conveys the continuous paper P, for example.

The present disclosure is not restricted to the aforementioned exemplary embodiment, and various modifications, alterations, and improvements are possible without deviating from the gist of the present disclosure. For example, two or more of the aforementioned modified examples may be combined, as appropriate.

The foregoing description of the exemplary embodiments of the present disclosure has been provided for the purposes of illustration and description. It is not intended to be exhaustive or to limit the disclosure to the precise forms disclosed. Many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A detection device comprising:
 a detection sensor comprising:
  a single light-emitting element that radiates light onto a conveyed material; and
  a plurality of light-receiving elements that receive interference light including the light that is scattered at a surface of the conveyed material and the light that is scattered inside the conveyed material,
 wherein the detection device further comprises a detection mechanism that acquires detection results of the plurality of light-receiving elements of the detection sensor, and performs averaging processing on the detection results to detect a conveying speed of the conveyed material, and wherein, in plan view, the plurality of light-receiving elements are arranged such that the light-emitting element is located therebetween in a conveyance direction of the conveyed material.

2. The detection device according to claim 1,
wherein, in plan view, the plurality of light-receiving elements are arranged in a circumferential direction centered about the light-emitting element.

3. The detection device according to claim 2,
wherein, in plan view, distances from centers of each of the plurality of light-receiving elements to a center of the light-emitting element are equal.

4. A conveying device comprising:
a conveying unit that conveys the conveyed material; and
the detection device according to claim 1 that detects the conveying speed of the conveyed material that is conveyed by the conveying unit.

5. An image forming device comprising:
the conveying device according to claim 4;
a first forming unit that forms an image on the conveyed material conveyed by the conveying unit; and
a second forming unit that forms an image on the conveyed material at a timing that is corrected based on the conveying speed of the conveyed material detected according to a detection result of the detection sensor which is arranged upstream from the second forming unit in a conveyance direction of the conveyed material.

6. The image forming device according to claim 5,
wherein the first forming unit forms an image on the conveyed material at a timing that is generated based on the conveying speed of the conveyed material detected according to a detection result of the detection sensor which is arranged upstream from the first forming unit in the conveyance direction of the conveyed material.

* * * * *